US006285628B1

United States Patent
Kiesel

(10) Patent No.: US 6,285,628 B1
(45) Date of Patent: Sep. 4, 2001

(54) SWEPT TRANSIT BEAM BATHYMETRIC SONAR

(75) Inventor: Kenneth C. Kiesel, Wayland, MA (US)

(73) Assignee: L3 Communications Corporation, East Walpole, MA (US)

( * ) Notice: Subject to any disclaimer, the term of this patent is extended or adjusted under 35 U.S.C. 154(b) by 0 days.

(21) Appl. No.: 09/394,847

(22) Filed: Sep. 13, 1999

(51) Int. Cl.[7] .............................. G01S 15/89; G01S 15/60
(52) U.S. Cl. .................. 367/138; 367/103; 367/105; 367/119; 367/137
(58) Field of Search ................................ 367/103, 105, 367/119, 121, 123, 137, 138; 73/626

(56) References Cited

U.S. PATENT DOCUMENTS

| | | | |
|---|---|---|---|
| H1491 | 9/1995 | Ivey et al. ............................. | 367/154 |
| 3,441,904 | 4/1969 | Wilson ................................... | 340/9 |
| 3,492,634 | 1/1970 | Massa .................................... | 340/9 |
| 3,603,920 | 9/1971 | Stedtmitz .............................. | 340/3 |
| 3,618,006 | * 11/1971 | Wright ................................. | 367/103 |
| 3,964,014 | 6/1976 | Tehon .................................... | 340/9 |
| 4,156,863 | 5/1979 | Madison et al. ....................... | 340/9 |
| 4,158,189 | 6/1979 | Wardle .................................. | 340/9 |
| 4,307,613 | * 12/1981 | Fox ....................................... | 367/105 |
| 4,359,767 | * 11/1982 | Sachs et al. .......................... | 367/105 |
| 4,414,654 | 11/1983 | Hill et al. ............................. | 367/103 |
| 4,864,179 | 9/1989 | Lapetina et al. ....................... | 310/337 |
| 4,965,776 | 10/1990 | Mueller ................................. | 367/126 |
| 4,989,530 | 2/1991 | Thompson, Jr. et al. ........... | 114/21.3 |
| 5,329,498 | * 7/1994 | Greenstein .......................... | 367/155 |
| 5,426,619 | 6/1995 | Madden et al. ...................... | 367/153 |
| 5,488,956 | * 2/1996 | Bartelt et al. ................... | 128/662.03 |
| 5,694,372 | 12/1997 | Perennes ............................... | 367/91 |
| 5,808,967 | 9/1998 | Yu et al. ............................... | 367/91 |

* cited by examiner

*Primary Examiner*—Ian J. Lobo
(74) *Attorney, Agent, or Firm*—Roberts & Mercanti, LLP

(57) ABSTRACT

The invention pertains a bathymetric sonar system involving a single swept transmit beam projector system which compensates for ship attitude and positioning changes. A sonar transducer array has a matrix of acoustic projector elements arranged in a plurality of substantially parallel rows and a plurality of substantially parallel columns; and means for causing each of the projector elements to generate an acoustic signal at a frequency and phase independently from each other projector element. Preferably the transducer array is operated by causing the projector elements to generate an acoustic signal at a frequency and phase independently from each other projector element, at a frequency and phase which is initially the same as the frequency and phase of each other element in its column and such that the frequency and phase of the projector elements in each column is different from each other column. Thus a single swept beam is projected toward the ocean floor. Then the frequency and phase of each projector element is modified to compensate for ship attitude and position changes.

37 Claims, 1 Drawing Sheet

SWEPT TRANSIT BEAM BATHYMETRIC SONAR

BACKGROUND OF THE INVENTION

1. Field of the Invention

The present invention relates to bathymetric sonars. More particularly the invention pertains to bathymetric sonar systems involving a single swept transmit beam projector system which compensates for ship attitude and positioning changes.

2. Description of the Related Art

Oceanographic measurements play an important role in all aspects of ocean science and engineering. Typical applications in applied marine science and engineering include mapping of pollutant transport, environmental monitoring, searching for pollution sources, national security, target localization, search and rescue, marine geophysics, resource exploration and resource production. Oceanographic measurements are a key component in the development of marine engineering, management, and policies.

In this regard, sonar systems may be used to detect, navigate, track, classify and locate objects in water using sound waves. In military applications, underwater acoustics is used for depth sounding; navigation; ship and submarine detection, ranging, and tracking; underwater communications; guidance and control of weapons; and mine detection. Civilian applications of underwater sound detection systems include depth sounding (bathymetry); bottom topographic mapping; object location; underwater beacons; wave-height measurement; doppler navigation; sub-bottom profiling; underwater imaging for inspection purposes; buried-pipeline location; underwater telemetry and control; diver communications; ship handling and docking aid; anti-stranding alert for ships; current flow measurement; and vessel velocity measurement.

A typical active sonar system includes a transmitter, i.e., a transducer commonly referred to as a source or projector to generate the sound waves, and a receiver, i.e., a transducer commonly referred to as a hydrophone to sense and measure the properties of the reflected echoes including frequency, amplitude and phase. In one type of sonar system called a "Mills Cross" system, the transmitter or projector array is mounted along the keel of a ship and radiates sound and the receiver or hydrophone array is mounted perpendicular to the transmitter array. The receiver array receives the echoes of the transmitted sound pulse, i.e., returns of the sound waves generated by the transmitter array. Thus, in a typical sonar system, acoustic energy is generated by the transmitter array, travels to the target, is reflected, and returns to the receiver array which measures the return signal. Such a conventional sonar system and transmitter and receiver array configuration is disclosed in U.S. Pat. No. 3,114,631. In those instances where the transmitter array is mounted along the keel of the ship, the transmitter array projects a fan-shaped sound beam which is narrow in the fore and aft direction but wide athwart ship. The signals received by the hydrophones in the receiver array are summed to form a receive beam which is narrow in the across track but wide in the along track direction. The intersection of the transmit and receive beams define the region in the sea floor from where the echo originated. Typically, by applying different time delays to the different hydrophones signals the receive beams can be steered in different directions and when a number of receive beams are formed simultaneously they, together with the transmit beam, define the sonar geometry.

An important consideration in the operation of sonar systems is the ability to survey an area without gaps in seafloor coverage when employing the system in such applications as depth sounding, bottom topographic mapping, object location, sub-bottom profiling, and underwater imaging for inspection purposes. One significant source of gaps in coverage stems from incomplete compensation of the transmit beam direction for ship attitude and position changes.

U.S. Pat. No. 5,808,967 discloses a two-dimensional array transducer and beamformer and which simultaneously transmits from transducer elements with phase or time-delayed signals to the elements. However, this arrangement uses multiple phase and/or time delay beamformers. Each beamformer has different phase or time delays to simultaneously form multiple beams at different angles of inclination to the array face. Thus multiple, narrow dispersion acoustic beams are formed in two planar dimensions normal to the array face.

U.S. Pat. No. 3,603,920 discloses a doppler effect velocity measuring device for determining the velocity and direction of movement which includes an array of transducer elements and the use of multi-phase signals to provide a plurality of signals of similar frequencies and of differing phase. A signal of a single phase is applied to a group of transducer elements in a cyclical repetition to produce a directive signal from the entire array of transducer elements. U.S. Pat. No. 3,441,904 discloses an electromechanical directional transducer which includes an array of elements having some of the elements wound in reverse phase relative to its neighbors to provide side lobe control. U.S. Pat. No. 4,989,530 discloses a torpedo having a pair of sidemounted planar arrays arranged in row and column means and having seven port and seven starboard beams formed simultaneously. None of these systems provide for projector element and/or receiver element compensation for ship attitude and position changes.

In a typical Mills cross swath bathymetric sonar system, a projector array is mounted along the keel of a ship and a receiver array is mounted perpendicular to the transmitter array. One use of such an array is sector scanning where a number of separate transmit pulses cover an entire swath in the athwartship direction. Such sonar systems can compensate for ship pitch and yaw, but are limited in their ability to compensate in shallow water, where short pulses are typically used. This invention overcomes the shortcomings of sector scanning, by sweeping a beam in the athwart ship direction and compensating continuously for pitch and yaw by using separate frequencies for each projector element. The sweep rate determines the effective pulse width. The faster the sweep, the shorter time the beam is focused on a particular spot on the sea floor, and the shorter the pulse width.

SUMMARY OF THE INVENTION

The invention provides a sonar transducer array which comprises:
- (a) a matrix of acoustic projector elements arranged in a plurality of substantially parallel rows and a plurality of substantially parallel columns;
- (b) means for causing each of the projector elements to generate an acoustic signal at a frequency and phase independently from each other projector element.

The invention also provides a method for forming a single acoustic beam from a sonar transducer array which comprises:
- (a) arranging a matrix of acoustic projector elements in a plurality of substantially parallel rows and a plurality of substantially parallel columns;

(b) causing the projector elements to generate an acoustic signal at a frequency or phase independently from each other projector element.

The invention further provides a method for forming a single acoustic beam from a sonar transducer array, which array comprises a matrix of acoustic projector elements in a plurality of substantially parallel rows and a plurality of substantially parallel columns; the method comprising causing the projector elements to generate an acoustic signal at a frequency and phase independently from each other projector element, at a frequency and phase which is the same as the frequency and phase of each other element in its column and such that the frequency and phase of the projector elements in each column is different from each other column.

DETAILED DESCRIPTION OF THE PREFERRED EMBODIMENT

Figure 1:
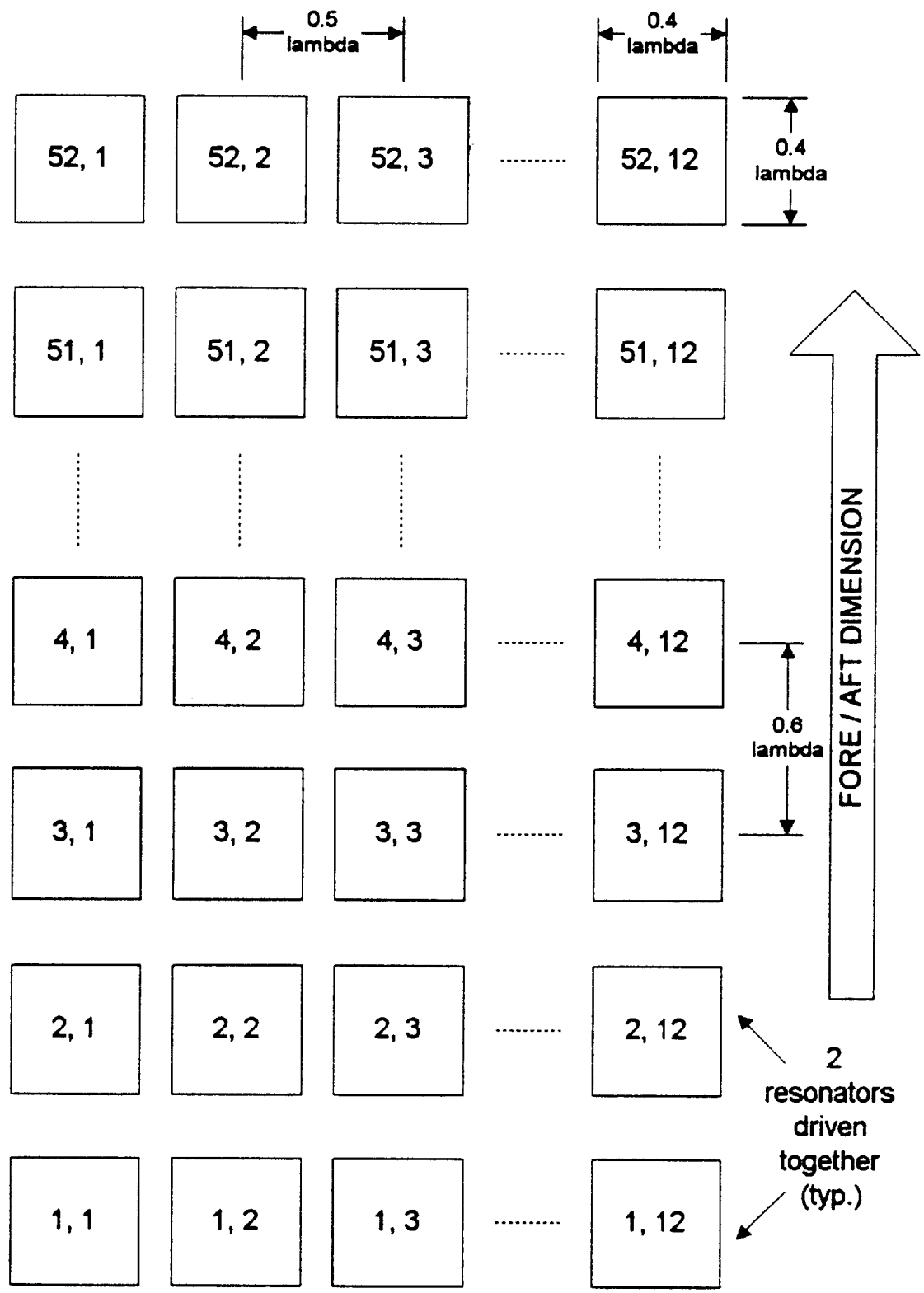
FIG. 1 shows a two dimensional grid of identical resonators used for the transmit array according to the invention.

FIG. 1 shows a transmit array according to the invention. Shown is a two dimensional grid of identical transmit resonators arranged in a planar matrix which is to be attached to the keel of a ship or a towed body. The acoustic face of each resonator is a square of side length 0.4 $\lambda$ at the designed sound speed. The resonators are spaced at 0.5 $\lambda$ intervals in the athwart ship direction, to avoid grating lobes when steering at large angles to the side. The along track resonator spacing is 0.6 $\lambda$ to minimize the number of resonators in the array. Two resonators may optionally be driven together in the along track direction, yielding a composite "element" dimension of 1.2 $\lambda$ along track by 0.5 $\lambda$ athwart ship. This produces grating lobes fore and aft, but they are far from the vertical for pitch steering of less than 10 degrees. They are down at least 10 dB from the main lobe, and are far outside the main lobe of the hydrophone array, so that the received signal will be at least 30 dB below the main lobe received signal.

FIG. 1 shows a preferred configuration of the projector array comprising a planar matrix of 12 resonators in the athwart ship direction and 26 pairs of resonators in the along track direction. The total number of resonators in this embodiment is 624, and the number of drive circuits here is 312. Using Dolph-Tschebyshev shading with a −30 dB side lobe level, the array produces a beam that is 2 degrees wide in the along track dimension and about 11 degrees wide in the athwart ship dimension when steered normal to the array face. Although a configuration of 52×12 resonators is shown, any number may be used and the quantity may be easily determined by those skilled in the art. Preferably the array may comprise from about 12 to about 128 rows and from about 8 to about 32 columns. More preferably the array may comprise from about 18 to about 64 rows and from about 12 to about 18 columns. The resonators themselves are well known in the art. Such may be, for example, 12 KHz ton pilz resonator ceramic transducers from L3 Communications ELAC Nautik, of Kiel, Germany. Preferably each projector element has its own drive circuit so that the frequency and phase of its signal can be individually controlled. The drive circuits themselves are well known in the art. In operation, it is preferred that the projector elements generate initial acoustic signals at a frequency and phase which is the same as the frequency and phase of each other projector element in its column and such that the frequency and phase of the projector elements in each column is different from each other column. In order to form an effective single beam sweeping action, the array of projector elements simultaneously generates an acoustic signal at a frequency and phase which is the same as the frequency and phase of each other projector element in its column, different from each other column, and at a constantly or periodically changing frequency to form a single sweeping acoustic beam at a continuously changing direction.

The pulse width is the time required for the main lobe of the single transmit beam to pass over a stationary point on the sea floor. Since any point will be at a fixed athwart ship angle at the time of transmit, the pulse width can also be considered to be the time required for the transmit beam's main lobe to sweep through a given angle. For the array of FIG. 1, with an 11 degree athwart ship beamwidth normal to the array, the pulse width near the vertical is the time for the beam to sweep through 11 degrees of athwart ship angle. To maintain a constant pulse width across the entire swath, the angular sweep rate must vary as a function of angle from the normal. For a flat array, the beamwidth varies approximately as the reciprocal of the cosine of the steer angle from normal, out to greater than 60 degrees. At 60 degrees to the side, the beamwidth is double that on the normal, or 22 degrees for the array of FIG. 1. At this point, the beam must sweep twice as fast as it does near the normal to maintain a constant pulse width. Each projector element is always on and the combined signals from each column of projectors causes a combined single beam. The beam continuously changes direction by constantly changing the instantaneous frequency and phase of the acoustic signal formed from each column of projectors.

In the prior art, a phase shift beamformer steers a beam by offsetting the phase of each element relative to the previous element to compensate for the increased or decreased path length from that element to the bottom in the steered beam direction. A maximum element to element phase difference occurs at the greatest steer angle to the array normal. To sweep a beam requires continuously varying the element to element phase difference from a maximum positive value through zero to a maximum negative value or vice versa. The preferred way to do this is to vary the element to element phase difference linearly with time by using a different frequency in each element.

A given set of frequencies, varying linearly from element to element in both axes will sweep the beam smoothly from an initial pointing angle to a second pointing angle in a period of time (a sweep segment). At this point a new set of frequencies is applied to sweep the beam to a third pointing angle. This process is repeated, with frequencies calculated such that each segment's final pointing angle is on the desired swath line. The initial beam angle is established by presetting phases into counters. This can be accomplished simply for pulsed sinusoids by driving each element at a slightly different frequency. For example, one may use the array configuration of FIG. 1 at a frequency of 20 KHz, and desire a 1-millisecond pulse near the vertical. One increases the element to element frequency and phase difference from zero at the vertical to enough to steer the beam 5.5 degrees to one side in one half the pulse width, or 0.5 millisecond. The element to element spacing is $\lambda/2$, which corresponds to a phase difference of 180 degrees. The element to element phase difference needed to steer the beam 5.5 degrees is therefore 180*sin(5.5°), or 17.25 degrees, approximately. This equates to about 34.5 degrees per millisecond, or 95.8 Hz. If this frequency difference is divided symmetrically about the array center, the following frequencies are obtained across the 12 athwart ship elements:

| 19,473.1 | 19,568.9 | 19,664.7 | 19,760.5 | 19,856.3 | 19,952.1 |
|---|---|---|---|---|---|
| 20,047.9 | 20,143.7 | 20,2395 | 20,335.3 | 20,431.1 | 20,526.9 |

Using different frequencies for each along track column of resonators causes the sweep rate to increase further from the array normal, as desired to offset the widening of the beam. A frequency difference will cause the sine of the steer angle to increase linearly. Thus, the rate of change of steer angle will be proportional to the cosine of the steer angle. The athwart ship beamwidth is very nearly inversely proportional to the cosine of the steer angle, at least out to about 60 degrees from the array normal. Thus, the two effects cancel and the pulse width is effectively constant.

The drive signals to the projector elements may be by analog or digital generation. Analog element signal generation may be by use of a Direct Digital Synthesizer (DDS), such as the Analog Devices AD9832 to control frequency and phase followed by a multiplying digital to analog converter (MDAC) to control the amplitude for shading. In a digital approach, the digital portion of a Direct Digital Synthesizer output could drive a digital circuit that turns one of two power FET's on during each half cycle of the DDS output period. Amplitude control would be achieved by varying the duty cycle of the FET's. The pulse covers a wide swath in the athwart ship direction and a narrow beam width in the along track direction. The pulse is a simple truncated sine wave signal. The beam is focused to a degree in the athwart ship direction, and can be steered in both the fore/aft and athwart ship axes. The beam is initially steered to one side of the desired swath, and maintained in that direction for a period of time approximately equal to the pulse width. After that, it is continually swept to the opposite side of the swath in a manner such that it ensonifies a straight line across the desired track line compensating for pitch and yaw. Upon arriving at the opposite end of the swath, it pauses there for a period of time approximately equal to the pulse width. The sweep rate is controlled to keep the pulse width at any athwart ship angle constant as the beam sweeps past. It will be wider, up to about twice the pulse width, in the area where the beam pauses at the outer swath limits.

To accomplish this method of transmission, the projector array is the aforementioned two dimensional array of identical resonators wherein each resonator has an identical dedicated power amplifier. Each power amplifier has amplitude, phase and frequency control. Amplitudes are set to minimize side lobes in both axes. Phases are set at the start of the ping to steer the beam to one side. After the initial dwell time, frequencies are changed to cause the beam to begin sweeping. When the beam reaches the end of the sweep, all frequencies are returned to the nominal sonar frequency to maintain the beam at that steer angle for the final dwell time. Initially the beam is unfocused (far field or plane wave beam). The more often the frequencies are updated, the more closely the beam can follow the range to the bottom as detected from the previous ping cycle. The transmit beam will need to compensate for ship attitude and position. In order to accomplish this, the frequencies are reset periodically during the sweep to compensate for pitch and yaw while sweeping. That is, in addition to updating frequencies during the sweep, the values for the transmitted frequencies for each element must be computed as a function of ship pitch, roll, yaw, heave and azimuth. The overall system interfaces with external equipment to receive position and attitude information. Such may include a gyro compass or accelerometer for attitude measurements and a global positioning satellite interface for longitude and latitude changes. One suitable device that can provide such data is a POS/MV which is commercially available from TSS, Ltd. of Oxfordshire, England. The attitude and position data modify the frequency of the next transmit beam formed from each column of projector elements to compensate for ship attitude and position. Pitch and yaw compensation can thus be done by controlling the relative frequencies of the projector elements. Since the beam is relatively wide in the athwart ship direction, the frequency corrections for pitch and yaw can be relatively infrequent. For example, in order to frequency compensate a sweep transmit for a 20 KHz one degree beamwidth system (624 resonator pairs) with a 1 millisecond transmit pulse, 1 frequency must be updated each 1.5 microseconds to adjust for pitch and yaw once within the pulse width. This would divide the sweep into about 10 segments to cover a 140-degree swath.

Preferably, not only is the transmit beam compensated for by ship attitude and position data, but the receive signals from the hydrophone array are compensated for by ship attitude and position data in order to extract valid bathymetric data from received acoustic signals as well as for forming an image from received acoustic signals. Acoustic signals received by the receive transducer array, after correction for vessel attitude and position are processed in real time to produce bathymetric data and image (side scan) data. Systems which perform this type of processing include the SEA BEAM 2100, manufactured by L-3 Communications SeaBeam Instruments of East Walpole, Mass. After data is processed, it is archived for use in generating a variety of topographical maps and large area sea floor images, for viewing on a computer display or for printing. Data can be displayed in a variety of ways, including contour maps, gray scale images, false color images, and 3-D shaded topographical plots. Systems for generating, displaying and printing data in these formats include the SeaView Post Processing System, manufactured by L-3 Communications SeaBeam Instruments of East Walpole, Mass.

The transmission method of this invention allows for the direction of transmission (beam direction) to be moved continuously in any pattern. The preferred pattern is to sweep in an arc. This arc causes the swept beam to intersect with a flat bottom in a straight line substantially perpendicular to the vessel track, compensating for the effects of pitch, yaw and roll on the vessel to which the array is attached. The beam is directed initially to one extreme, either the port or starboard extreme. It then moves smoothly through the vertical to the opposite extreme. To accomplish this, each element in the array is driven individually by a signal having a different initial phase and a different frequency. The frequencies are calculated to produce a phase relationship among the elements of the array that changes continuously over time in a manner to move the beam smoothly in the desired direction. Frequencies for each array element are updated periodically without interrupting transmission to maintain the desired direction of beam movement. If there were no need to compensate for pitch and yaw, each column could be driven by the same frequency and the frequency successively progresses from each column to the next. This causes the beam to move in an arc perpendicular to the fore/aft array axis. To compensate for pitch and yaw it is necessary to steer the beam fore and aft as well as side to side. This requires a unique frequency for each element in both axes. So each element has its own control circuit and its frequency is updated for attitude and position changes. The inventive technique transmits a single moving beam continuously and moves the beam continuous during a single transmission.

As can be seen, the swept transmit beam is a practical alternative to sector scanning as a means of compensating for ship attitude and position in a swath bathymetric sonar. It offers several advantages over sector scanning. Because it transmits a single frequency, it can be used with short transmit pulses in shallow water, unlike sector scanning. In addition to compensating better for pitch and yaw in shallow water, it can be dynamically focused, allowing full array resolution to be achieved in shallow water without near field effects. It simplifies echo detection, as only one frequency is used for the entire swath. The array complexity and power amplifier requirements are comparable to those of a sector-scanned system.

What is claimed is:

1. A sonar transducer array which comprises:
   (a) a matrix of acoustic projector elements arranged in a plurality of substantially parallel rows and a plurality of substantially parallel columns;
   (b) means for causing each of the projector elements to generate an acoustic signal at a frequency and phase independently from each other projector element;
   wherein (b) comprises means for causing the projector elements to simultaneously generate an acoustic signal at a frequency and phase independently from each other projector element, and at a constantly or periodically changing frequency and phase to to form a single sweeping acoustic beam at a continuously changing direction.

2. The sonar transducer array of claim 1 comprising means for causing the projector elements to generate acoustic signals at a frequency and phase which is the same as the frequency and phase of each other projector element in its column and such that the frequency and phase of the projector elements in each column is different from each other column.

3. The sonar transducer array of claim 1 wherein the matrix is planar.

4. The sonar transducer array of claim 1 comprising from about 12 to about 128 rows and from about 8 to about 32 columns.

5. The sonar transducer array of claim 1 comprising from about 18 to about 64 rows and from about 12 to about 18 columns.

6. The sonar transducer array of claim 1 comprising 52 rows and 12 columns of projector elements.

7. The sonar transducer array of claim 1 further comprising means for modifying the frequency and phase of the generated acoustic signals responsive to at least one of ship attitude sensors and ship position sensors.

8. The sonar transducer array of claim 1 further comprising an array of receive transducers for receiving reflected acoustic signals.

9. The sonar transducer array of claim 8 further comprising means for modifying received acoustic signals responsive to at least one of ship attitude sensors and ship position sensors.

10. The sonar transducer array of claim 8 further comprising means for modifying the received acoustic signals responsive to a ship attitude sensor, a ship position sensor or both a ship attitude sensor and a ship position sensor.

11. The sonar transducer array of claim 8 further comprising means for extracting bathymetric data from received acoustic signals.

12. The sonar transducer array of claim 8 further comprising means for forming an image from received acoustic signals.

13. The sonar transducer array of claim 8 further comprising means for extracting bathymetric data from received acoustic signals and means for forming an image from received acoustic signals.

14. A method for forming a single acoustic beam from a sonar transducer array which comprises:
   (a) arranging a matrix of acoustic projector elements in a plurality of substantially parallel rows and a plurality of substantially parallel columns;
   (b) causing the projector elements to simultaneously generate an acoustic signal at a frequency and phase independently from each other porjector element, and at a constantly or periodically changing frequency and phase to form a single sweeping acoustic beam at a continuously changing direction.

15. The method of claim 14 comprising causing the projector elements to generate acoustic signals at a frequency and phase which is the same as the frequency and phase of each other projector element in its column and such that the frequency and phase of the projector elements in each column is different from each other column.

16. The method of claim 14 wherein each of the projector elements projects an acoustic signal simultaneously.

17. The method of claim 14 wherein the matrix is planar.

18. The method of claim 14 comprising from about 12 to about 128 rows and from about 8 to about 32 columns.

19. The method of claim 14 comprising from about 18 to about 64 rows and from about 12 to about 18 columns.

20. The method of claim 14 comprising 52 rows and 12 columns of projector elements.

21. The method of claim 14 further comprising modifying the frequency and phase of the generated acoustic signals responsive to at least one of ship attitude sensors and ship position sensors.

22. The method of claim 14 further comprising receiving reflected acoustic signals from an array of receive transducers.

23. The method of claim 22 further comprising modifying received acoustic signals responsive to at least one of ship attitude sensors and ship position sensors.

24. The method of claim 22 further comprising modifying the received acoustic signals responsive to a ship attitude sensor, a ship position sensor or both a ship attitude sensor and a ship position sensor.

25. The method of claim 22 further comprising extracting bathymetric data from received acoustic signals.

26. The method of claim 22 further comprising forming an image from received acoustic signals.

27. The method of claim 22 further comprising extracting bathymetric data from received acoustic signals and forming an image from received acoustic signals.

28. A method for forming a single acoustic beam from a sonar transducer array, which array comprises a matrix of acoustic projector elements in a plurality of substantially parallel rows and a plurality of substantially parallel columns; the method comprising causing the projector elements to generate an acoustic signal at a frequency and phase independently from each other projector element, at a frequency and phase which is the same as the frequency and phase of each other element in its column and such that the frequency and phase of the projector elements in each column is different from each other column.

29. The method of claim 28 wherein each of the projector elements projects an acoustic signal simultaneously.

30. The method of claim 28 further comprising means for modifying the frequency and phase of the generated acoustic signals responsive to at least one of ship attitude sensors and ship position sensors.

31. The method of claim 28 where step (b) comprises causing each of the projector elements to simultaneously generate an acoustic signal at a frequency and phase independently from each other projector element, and at a constantly or periodically changing frequency and phase to form a single sweeping acoustic beam at a continuously changing direction.

32. The method of claim 28 further comprising receiving reflected acoustic signals from an array of receive transducers.

33. The method of claim 28 further comprising modifying received acoustic signals responsive to at least one of ship attitude sensors and ship position sensors.

34. The method of claim 28 further comprising modifying the received acoustic signals responsive to a ship attitude sensor, a ship position sensor or both a ship attitude sensor and a ship position sensor.

35. The method of claim 28 further comprising extracting bathymetric data from received acoustic signals.

36. The method of claim 28 further comprising forming an image from received acoustic signals.

37. The method of claim 28 further comprising extracting bathymetric data from received acoustic signals and forming an image from received acoustic signals.

* * * * *